Feb. 18, 1930. C. KIBBLEWHITE 1,747,247
ELECTRIC PROTECTIVE ARRANGEMENT
Filed Oct. 29, 1927 2 Sheets-Sheet 1
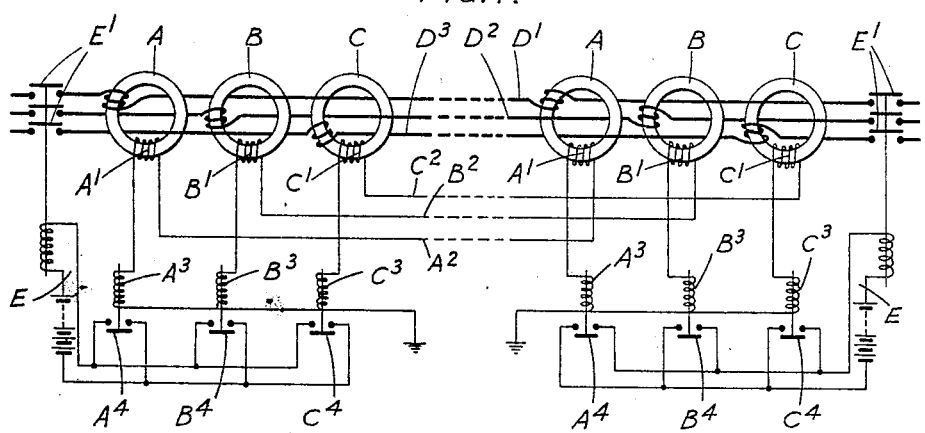
FIG. 1.
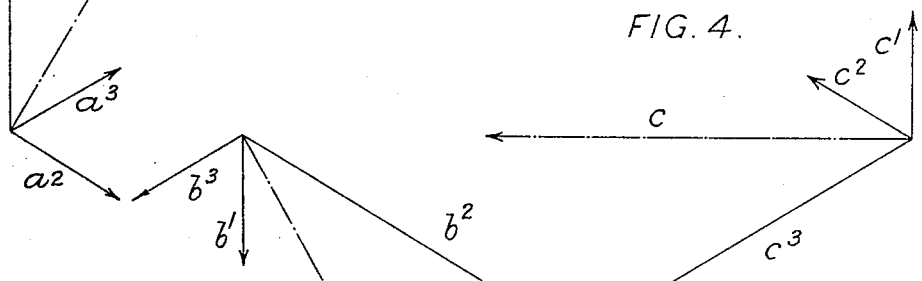
FIG. 2.
FIG. 3.
FIG. 4.
INVENTOR
By Curtiss Kibblewhite,
Watson, Coit, Morse & Grindle.
ATTYS.

Feb. 18, 1930.  C. KIBBLEWHITE  1,747,247
ELECTRIC PROTECTIVE ARRANGEMENT
Filed Oct. 29, 1927   2 Sheets-Sheet 2

INVENTOR
Curtiss Kibblewhite,
BY Watson, Crit. Morse & Grindle.
ATTYS.

Patented Feb. 18, 1930

1,747,247

UNITED STATES PATENT OFFICE

CURTIS KIBBLEWHITE, OF LONDON, ENGLAND, ASSIGNOR TO CALLENDER'S CABLE & CONSTRUCTION COMPANY, LIMITED, OF LONDON, ENGLAND, A COMPANY OF GREAT BRITAIN

ELECTRIC PROTECTIVE ARRANGEMENT

Application filed October 29, 1927, Serial No. 229,595, and in Great Britain December 3, 1926.

This invention relates to a protective arrangement for A. C. electric circuits (such for example as feeders or machine windings or other electrical apparatus) of the kind in which the operation of relays or other protective devices in a secondary circuit is due to the interaction between two (or more) current transformers in the protected circuit. In such arrangements difficulties have arisen owing to the undesired operation of the protective devices due to heavy straight-through overloads (caused for example by faults on parts of the system external to the protected section), such undesired operation resulting from the practical difficulty of manufacturing two exactly equal current transformers.

The present invention has for its object to provide a protective arrangement of the kind described, in which this undesired operation is prevented, and to this end according to the invention each protective current transformer is so arranged that its core is saturated or nearly saturated when normal full-load currents are flowing in the protected circuit. Thus in instances where the core is not fully saturated at normal loads, it becomes saturated at a critical overload value, which is considerably less than that which would cause the undesired operation above referred to, but is greater than the normal load current by an amount dependent upon the conditions in the primary circuit. Thus in the case of a feeder designed to carry a normal full-load current of, say 200 amperes, the critical overload value, at which saturation takes place, would conveniently be between 400 and 700 amperes. It is to be understood that the term "saturation" is used to indicate the condition of the core when a relatively large increase in the primary current causes a negligible increase in the flux in the core. If therefore the primary current increases beyond the critical value, it will cause a negligible increase in the flux flowing in the core and consequently also little, if any, increase in the E. M. F. induced in the secondary circuit. Thus in a balanced protective system, if two current transformers have been balanced against one another for all values of primary current up to the critical value, they will remain balanced for all overload values.

In order to obtain satisfactory operation of the protective devices under fault conditions, the current transformer primary windings are conveniently so arranged that the effect of a fault in the protected circuit is to cause a large phase displacement of the flux flowing in the transformer core or cores at one end. In some instances the employment of a single transformer at each end will be sufficient, but more usually it will be desirable to employ two or more transformers, in each of which the core is saturated or nearly saturated at normal full-load. Thus, when used for the protection of a three-phase circuit, the three primary phase-conductors may be wound with such numbers of turns and in such directions through each transformer core that there is a resultant main flux in the core which is out of phase with two or all of the phase-components. If this resultant flux is in phase or very nearly in phase with one of the phase-components, an earth fault on the corresponding phase conductor will cause only a very small phase displacement of the flux, which may be insufficient to cause the operation of the protective devices in the secondary circuit. The provision of a second transformer so wound that the resultant flux has a different phase-relationship to the three phase-components (for example 90° out of phase with the phase component with which the resultant flux of the first transformer is in phase) will however ensure the operation of the protective devices for such an earth fault.

The invention may be carried into practice in various ways, but the accompanying drawings illustrate diagrammatically by way of example two convenient arrangements in which the invention is applied respectively to a balanced protective arrangement of the Merz-Price type and to a protective arrangement of the kind known as the four-conductor system, in both cases for the protection of a three-phase feeder. In these drawings:—

Figure 1 shows the application to a Merz-Price protective system,

Figures 2–4 are vector diagrams associated with Figure 1,

Figure 5:
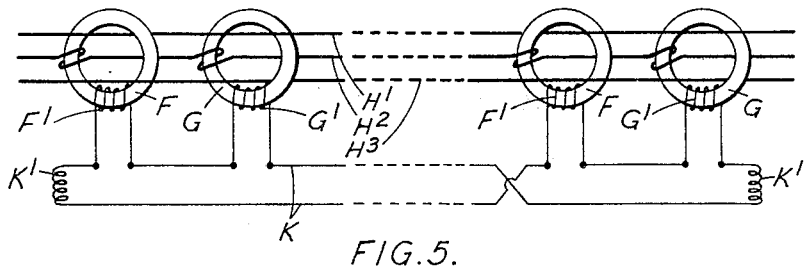
Figure 5 illustrates a modification of the arrangement of Figure 1.

In the arrangement of Figure 1 three current transformers A B C of the iron core ring type are employed at each end of the protected feeder, the three phase-conductors $D^1$ $D^2$ $D^3$ of which are passed through or wound on each core. The phase-conductor $D^1$ has three turns round the transformer core A, one turn in the same direction through the core C and one turn in the reverse direction through the core B. The other phase-conductors $D^2$ and $D^3$ are similarly wound on the cores, the three-turn windings for these conductors being respectively on cores B and C. Thus each core has three primary phase-windings, one of three turns, another of one turn in the same direction, and the third of one turn in the reverse direction. To obtain the maximum flux density at full load, the numbers of turns in the primary windings may be increased in the same ratio.

Figures 2, 3 and 4 are respectively vector diagrams of the flux components in the cores A, B and C, the resultant fluxes being indicated by $a$, $b$ and $c$ whilst the index numerals 1, 2 and 3 indicate respectively the flux components due to the phase-conductors $D^1$, $D^2$ and $D^3$. From these vector diagrams it will be seen that the resultant flux $a$ in the core A is (assuming a balanced three-phase load) 30° out of phase with the flux component $a^1$ due to the three-turn winding, 30° out of phase with the flux component $a^3$ due to the reversed winding, and 90° out of phase with the remaining flux component $a^2$. The resultant fluxes $a$ $b$ $c$ are 120° out of phase with one another and are of equal magnitude, and consequently the three secondary windings $A^1$ $B^1$ $C^1$ can be connected in star on one side. The other sides of the secondary windings are connected through pilot wires $A^2$ $B^2$ $C^2$ to the corresponding secondary windings at the other end of the feeder, the arrangement being such that the E. M. F.'s induced in the secondary circuit normally balance one another. The magnitude of the resultant flux $a$ or $b$ or $c$ in each core is preferably such that the core becomes saturated at 100% to 200% overload. The current transformers are so constructed that a sufficiently accurate balance is obtained right up to the saturation point. The protective devices in the secondary circuit may be arranged in various ways, but in one convenient arrangement three relays $A^3$ $B^3$ $C^3$ are provided at each end between the transformer secondaries and the star-point, the normally open contacts $A^4$ $B^4$ $C^4$ of these relays being connected in parallel to control a tripping circuit E for a circuit-breaker $E^1$ in the feeder, so that the operation of any one relay will cause the tripping of the circuit-breaker.

Thus at normal loads and for small overloads the resultant fluxes $a$ $b$ $c$ in the transformer cores will be equal to one another and there will be no appreciable out-of-balance effect in the secondary circuit. For heavy straight-through overloads all the transformer cores will be saturated and the normal balance in the secondary circuit will still be maintained. If an earth fault occurs, say on the conductor $D^1$, the fault current will cause a large phase-displacement of the resultant flux $c$ in the core C at one end in which the resultant flux is 90° out of phase with the flux component $c^1$ corresponding to the faulty conductor, with the result that the normal balance is disturbed and the relays $C^3$ will operate to trip out the feeder at both ends. In the case of an interphase fault, say between the conductors $D^1$ and $D^3$, the flux set up by the fault current in the cores A and C at one end will be 60° out of phase with the resultant flux $a$ or $c$, but an out-of-balance effect sufficient to operate the relays will be caused in the secondary circuit, owing to the fact that the fault current flows in the two conductors $D^1$ and $D^3$ and the resultant ampere-turns due to the fault are twice as great as those due to an earth fault of similar magnitude on the phase-conductor whose flux-component is 90° out of phase with the resultant flux. Thus the arrangement described will give satisfactory operation for earth faults and interphase faults but will remain inoperative in the case of heavy straight-through overloads.

In the foregoing description it has been assumed that the load has unity power factor. The effect of a change in load power factor is to alter the angle between the resultant flux and the fault flux, for the latter can be assumed (except possibly in the case of faults in the neighbourhood of the generator) to be in phase or nearly in phase with the voltage, whilst the former rotates in phase as the power factor alters. Consequently a change in power factor will reduce the out-of-balance effect due to the phase-displacement of the resultant flux (by, say, an earth fault in the conductor $D^1$) in the core C. This reduction in the out-of-balance effect may be such as to prevent the operation of the relays $C^3$ in the case of a large change in power factor, but such a change in power factor will also rotate the resultant flux in the other two cores A B, so that in at least one core the phase-angle between the fault flux and the resultant flux will always be large enough to ensure satisfactory operation.

It will be clear that this arrangement may be modified in various ways, for example by employing other ratios between the numbers of turns in the various primary windings, and it will usually be possible to obtain satisfactory operation with two transformers only at each end instead of three, such a modification being illustrated in Figure 5. A single transformer at each end with suitable primary windings may in some cases be sufficient.

Figure 6:
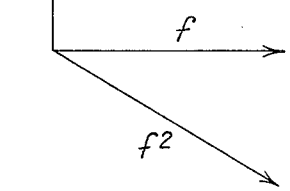
Figures 6 and 7 are vector diagrams associated with Figure 5.
Figure 7:

In the modification shown in Figure 5, the two transformers F G at each end of the feeder $H^1$ $H^2$ $H^3$ each have two primary windings, one of two turns and the other of one turn. The two-windings of both transformers are in the phase-conductor $H^2$. The phase-conductor $H^1$ has one turn through the core F but is not wound on the core G, whilst the phase-conductor $H^3$ has one turn through the core G but is not wound on the core F. The arrangements are identical at the two ends of the feeder and all windings are in the same direction. The secondary windings $F^1$ $G^1$ are suitably connected in a two-core pilot circuit K so that there is normally a balance of E. M. F.'s in that circuit and a protective relay $K^1$ is provided at each end, the tripping circuits being omitted for the sake of simplicity. Figures 6 and 7 respectively show the flux vector diagrams for the cores F and G, the flux-components in the core F being indicated by $f^1$ for phase-conductor $H^1$ and $f^2$ for phase-conductor $H^2$ with resultant $f$, and in the core G by $g^2$ for phase-conductor $H^2$ and $g^3$ for phase-conductor $H^3$ with resultant $g$. There is a phase-angle of 60° between the resultant fluxes $f$ and $g$. It will be clear without further description that faults of all kinds will produce a relatively large phase displacement in the resultant flux in at least one of the cores at one end, so that the normal balance will be destroyed and the relays $K^1$ will operate. It should be pointed out that although a very heavy earth fault on phase $H^1$ or $H^3$ would tend to bring the resultant fluxes in the two cores F and G towards opposition, (a condition which might impede operation owing to the tendency for the E. M. F.'s in the two secondary windings $F^1$ and $G^1$ to cancel one another) the phase angle between them can never be greater than 120° and operation of the relays would take place long before the fault current attained such magnitude. It will also be appreciated that the arrangement will operate satisfactorily with a lagging load power factor, unless the power factor is reduced to an extremely low and quite abnormal value.

Figure 8:
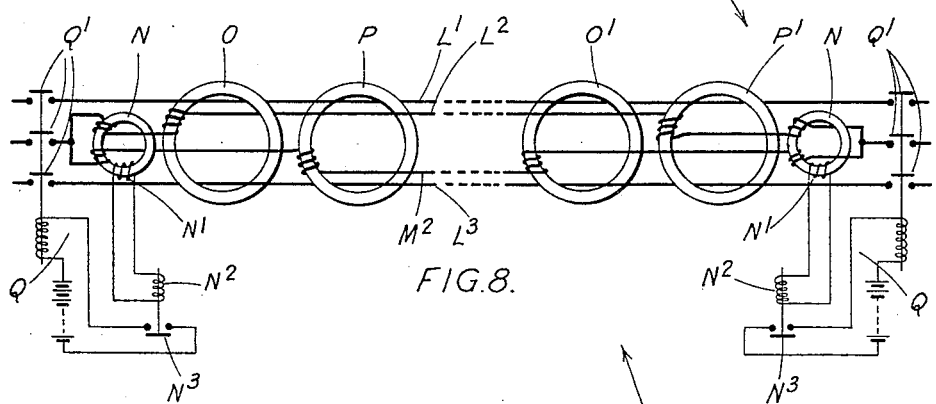
Figure 8 shows the application to a four-conductor protective system.

Figure 8 shows the application of the invention to the four-conductor system of protection. In this known system the protected three-phase feeder has four conductors, two of which $L^2$ $M^2$ form the split conductors in one phase, whilst the other two $L^1$ $L^3$ will be referred to as the "unsplit" phase-conductors. A relay operating current transformer N and one or more (in the example illustrated two) balancing transformers O P (or $O^1$ $P^1$) are provided at each end of the feeder, the two split conductors $L^2$ $M^2$ being passed in opposite directions through the core of the current transformer N. The secondary winding $N^1$ of the current transformer N operates a protective relay $N^2$, whose contacts $N^3$ control a tripping circuit Q for a circuit-breaker $Q^1$ in the feeder. The balancing transformers each have windings in circuit with one or both of the split conductors $L^2$ $M^2$ and one or both of the unsplit conductors $L^1$ $L^3$. Thus the operation of the tripping relays $N^2$ in the event of faults is due to the interaction between the balancing transformers which disturbs the normal balance in the relay operating current transformers.

The invention can be applied to this system in various ways but in the arrangement shown in Figure 8 each balancing transformer has three primary windings. The transformer O has a four-turn winding in the split conductor $L^2$, a one-turn winding in the same direction in the unsplit conductor $L^1$, and a one-turn winding in the opposite direction in the unsplit conductor $L^3$. The other split conductor $M^2$ has a four-turn winding on the transformer P in a direction opposite to the four-turn winding on the transformer O, and the two unsplit conductors $L^1$ $L^3$ each have one-turn windings on the transformer P in the same direction as those in the transformer O. At the other end of the feeder the windings on the transformers $O^1$ and $P^1$ are similar to those on O and P, except that the split conductor $L^2$ is wound on the transformer $P^1$ and the split conductor $M^2$ on $O^1$. Thus there will normally be a balance in the current transformers N.

Figure 9:
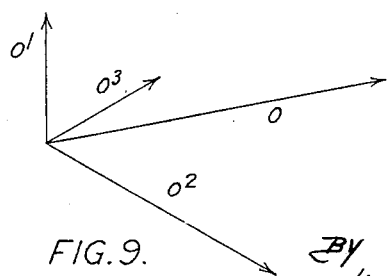
Figures 9 and 10 are vector diagrams associated with Figure 8.
Figure 10:
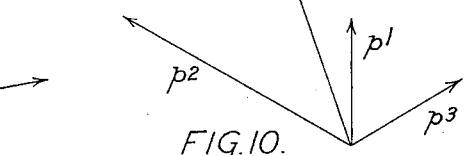

Figures 9 and 10 are flux vector diagrams respectively for the cores O and $O^1$ and the cores P and $P^1$, the flux-components for the three phases being indicated by $o^1$ $o^2$ $o^3$ and $p^1$ $p^2$ $p^3$ with resultants $o$ and $p$ respectively. It will be seen that there is a phase-angle of somewhat more than 90° between the two resultant fluxes $o$ and $p$.

As in the Merz-Price arrangement of Figure 1 or Figure 5, the passage of heavy straight-through overloads will not disturb the normal balance, but faults of all kinds in the protected section will cause a relatively large phase-displacement of the resultant flux in one or both cores at one end, so that the relays $N^2$ will operate to cut out the feeder. Since the resultant fluxes $o$ and $p$ are about 90° out of phase with one another, a change in power factor will simultaneously cause a phase-rotation of both fluxes and one at least of them will be sufficiently out of phase with each phase-component to cause the desired out-of-balance effect for all faults.

The arrangement according to the invention has the further advantage that, owing to the relatively low value of primary current at which the transformer core becomes saturated, the behaviour of the transformer can be thoroughly tested right up to the saturation point with the test conditions ordinarily available in manufacturing establishments, and consequently a high degree of accuracy in balancing can be readily obtained.

It will be appreciated that the two arrangements more particularly described have been given by way of example only and that they can be modified in various ways within the scope of the invention. Moreover the invention can readily be applied to protective systems of other types.

What I claim as my invention and desire to secure by Letters Patent is:—

1. In an electric protective arrangement for a three-phase four-conductor feeder wherein two of the conductors constitute split conductors in one phase, the combination of a plurality of protective current transformers at each end of the feeder on whose cores the four conductors are wound in such a manner that a fault in the feeder will disturb the normal balance between the currents flowing in the two split conductors, and means responsive to a difference between the currents flowing in the two split conductors for cutting out the feeder at both ends, each protective current transformer being so arranged that its core is saturated or nearly saturated at normal full-load current.

2. In an electric protective arrangement for a three-phase four-conductor feeder wherein two of the conductors constitute split conductors in one phase, the combination of a plurality of protective current transformers at each end of the feeder on whose cores the four conductors are wound in such a manner that a fault in the feeder will disturb the normal balance between the currents flowing in the two split conductors, and means responsive to a difference between the currents flowing in the two split conductors for cutting out the feeder at both ends, each protective current transformer being so arranged for the purpose of preventing the undesired operation of the protective devices due to heavy straight-through overloads that its core is nearly saturated at normal full-load current and becomes saturated at a critical overload value which is considerably less than that which would cause such undesired operation.

3. In an electric protective arrangement for a three-phase four-conductor feeder wherein two of the conductors constitute split conductors in one phase, the combination of a plurality of protective current transformers at each end of the feeder on whose cores the four conductors are wound in such a manner that a fault in the feeder will disturb the normal balance between the currents flowing in the two split conductors, and means responsive to a difference between the currents flowing in the two split conductors for cutting out the feeder at both ends, each protective current transformer being so arranged that its core is saturated or nearly saturated at normal full-load current and having its windings so arranged that the effect of a fault in the feeder is to cause a large phase displacement of the resultant main flux in at least one of the cores at each end.

4. In an electric protective arrangement for a three-phase four-conductor feeder wherein two of the conductors constitute split conductors in one phase, the combination of a plurality of protective current transformers at each end of the feeder each transformer being so arranged that its core is saturated or nearly saturated at normal full-load current, and means responsive to a difference between the currents flowing in the two split conductors for cutting out the feeder at both ends, the four conductors being wound with such numbers of turns and in such directions through the transformer cores that the flux component corresponding to each phase in at least one of the cores at each end is out of phase with the resultant main flux in that core, whereby a fault in the feeder will cause a large phase displacement of the resultant main flux in at least one of the cores at each end and will thus disturb the normal balance between the currents flowing in the two split conductors.

5. An electric protective arrangement for a three-phase feeder, including in combination a pair of protective current transformers at each end of the feeder each transformer having its core saturated or nearly saturated at normal full-load current, protective devices operable due to the interaction between such pairs of transformers to isolate the feeder when a fault occurs thereon, the phase-conductors of the feeder being wound with such numbers of turns and in such directions through the transformer cores that the resultant main flux in one transformer core at each end is approximately 90° out of phase with the flux component corresponding to one phase whilst the resultant main flux in the other transformer core at each end is approximately 90° out of phase with the flux component corresponding to another phase.

6. An electric protective arrangement for a polyphase circuit comprising a plurality of protective current transformers in the protected circuit and protective devices operable due to the interaction between such transformers in the event of a fault to cut out the protected circuit, each of said transformers having at least two unequal primary windings energized from separate phases of the protected circuit and arranged to saturate or nearly saturate magnetically the iron core of said transformer when normal full load current flows in the protected circuit, the several phases of the protected circuit being so connected to the protective current transformers that the resultant flux produced in the core of at least one of the transformers is phase displaced when a fault occurs in the said protected circuit.

In testimony whereof I have signed my name to this specification.

CURTIS KIBBLEWHITE.